United States Patent [19]

Huffman et al.

[11] Patent Number: 4,601,028

[45] Date of Patent: Jul. 15, 1986

[54] METHOD OF AND APPARATUS FOR CHECKING DATAPATH FAILURE IN A COMMUNICATION MULDEM

[75] Inventors: Charles E. Huffman, Plano; Paul E. Pepmiller, Richardson, both of Tex.

[73] Assignee: Rockwell International Corporation, El Segundo, Calif.

[21] Appl. No.: 621,397

[22] Filed: Jun. 18, 1984

[51] Int. Cl.⁴ ............... H04J 1/16; H04J 3/14; H04J 3/22

[52] U.S. Cl. ..................... 370/15; 370/84; 370/13

[58] Field of Search .............. 370/13, 14, 15, 84; 371/24, 25

[56] References Cited

U.S. PATENT DOCUMENTS

| | | | |
|---|---|---|---|
| 4,002,847 | 1/1977 | Dali | 370/15 |
| 4,244,046 | 1/1981 | Broard et al. | 370/84 |
| 4,247,934 | 1/1981 | Parras | 370/15 |
| 4,315,330 | 2/1982 | Brickman et al. | 370/15 |
| 4,375,681 | 3/1983 | Abbott et al. | 370/84 |
| 4,376,998 | 3/1983 | Abbott et al. | 370/14 |
| 4,488,293 | 12/1984 | Haussmann et al. | 370/84 |

Primary Examiner—Douglas W. Olms
Assistant Examiner—Wellington Chin
Attorney, Agent, or Firm—Bruce C. Lutz; V. L. Sewell; H. Fredrick Hamann

[57] ABSTRACT

Actual customer data is routed through a composite muldem which comprises a high speed section and a plurality of low speed sections with the signals being switched or transferred between the high speed and low speed sections all at a common frequency. This same customer data is then tested by a bit by bit comparison circuit which tests the data after it is split, rerouted in various datapath configurations and compared in a logical fashion to first detect datapath failure and then isolate the failure to a specific part of the composite muldem by a set of logical deductions.

9 Claims, 14 Drawing Figures

METHOD OF AND APPARATUS FOR CHECKING DATAPATH FAILURE IN A COMMUNICATION MULDEM

The present invention is generally concerned with electronics and more specifically concerned with data communications. Even more specifically, the present invention is concerned with an approach for detecting and isolating datapath failures in a data communication composite muldem.

There are many versions of data muldems in the art. In most or all of these muldems, there has to be some sort of automatic testing to ascertain when a portion of the muldem has failed so that a spare unit can be switched into service to maintain communications. This testing has to be done on a substantially continuous, although periodic basis, since it is very important that communications have a high datapath connect reliability figure. Patented examples of prior art muldems accomplishing this function are U.S. Pat. Nos. 4,375,682 and 4,376,999, both of which are Abbott, et al., patents assigned to the same assignee as the present invention.

These prior art references do not use a common reference point or they use a signal generator to generate a signal used to test the various portions of the muldem in various ways in an attempt to isolate datapath failures.

The present invention eliminates the requirement for a signal generator by using the customer supplied data and by designing the muldem in such a way that there is a common intermediate frequency between network (high speed) and customer (low speed) muldem sections, the data signals can be routed through spare units in such a way that a logical deduction process can be used to first detect datapath failure and then isolate this datapath failure to a specific section of the muldem. The testing can, in some failure modes, ascertain that the datapath failure has occurred in an upstream or downstream muldem and even isolate which section of this remote muldem is involved in generating the datapath error.

It is accordingly an object of the present inventive concept to provide an improved muldem design and to accomplish a cost and parts reduction by eliminating part of the prior art required circuitry necessary for providing testing of the unit.

Other objects and advantages of the present inventive concept may be ascertained from a reading of the specification and appended claims in conjunction with the drawings wherein:

Figure 12:
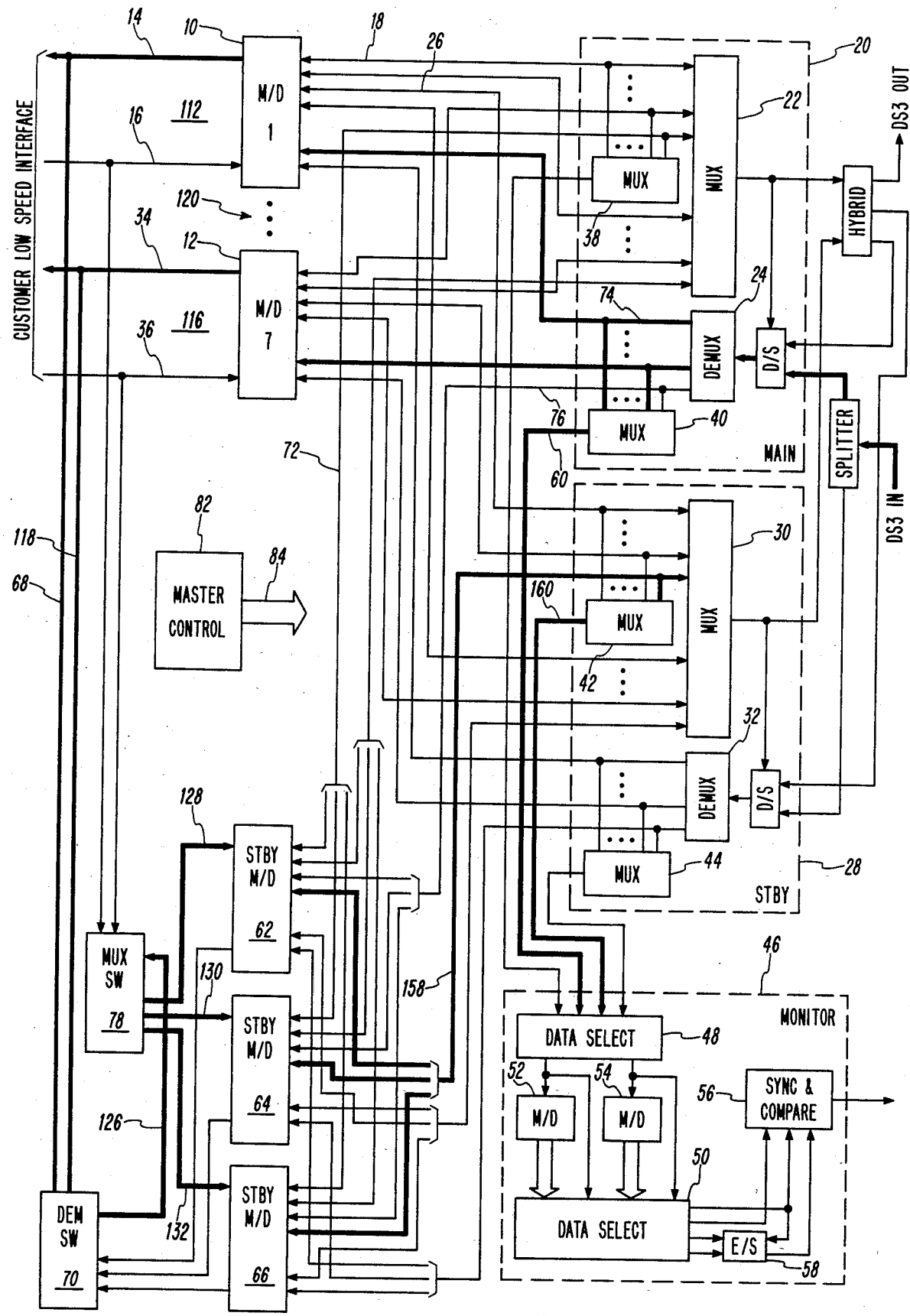
Figure 13:
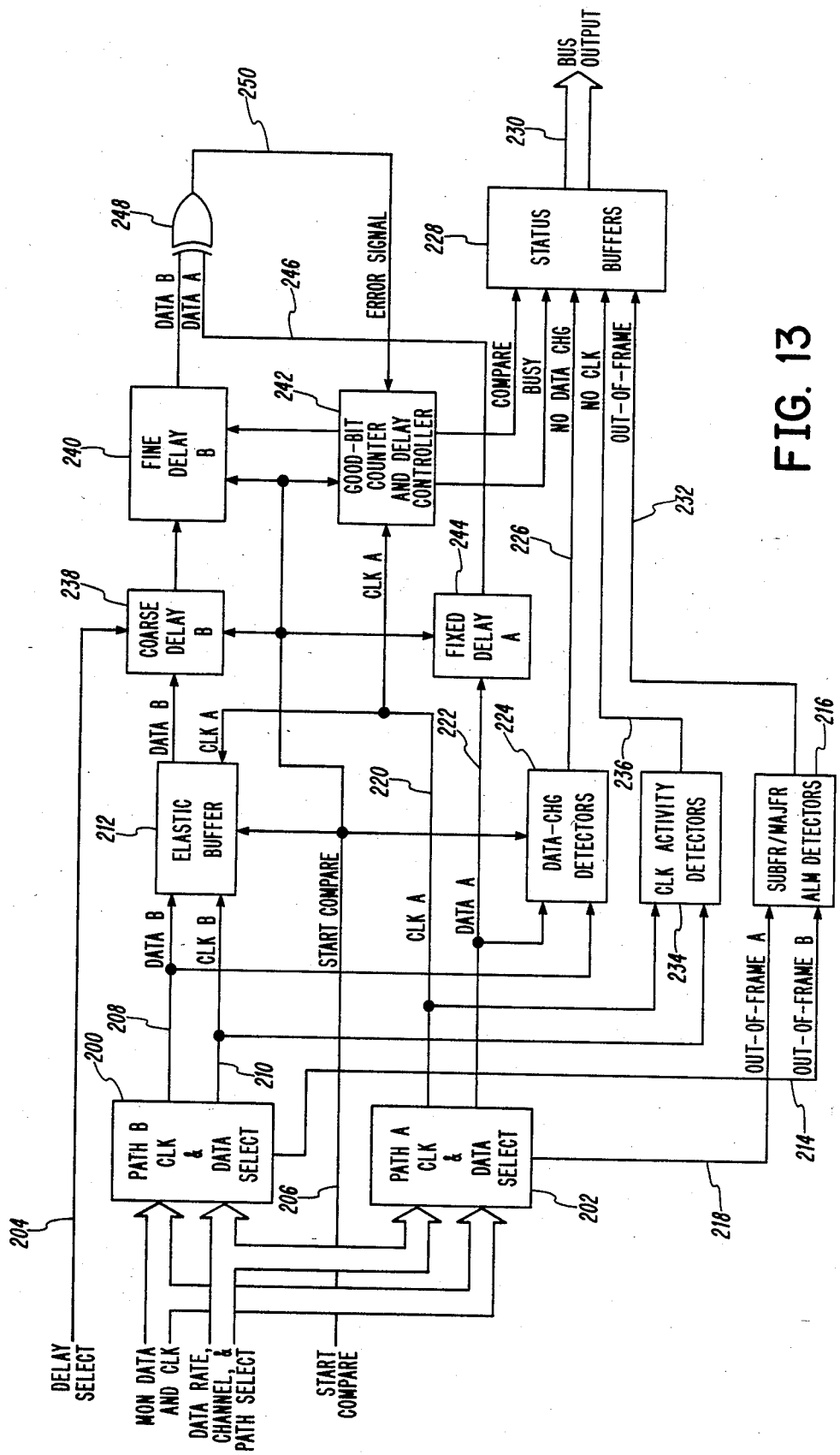
Figure 14:
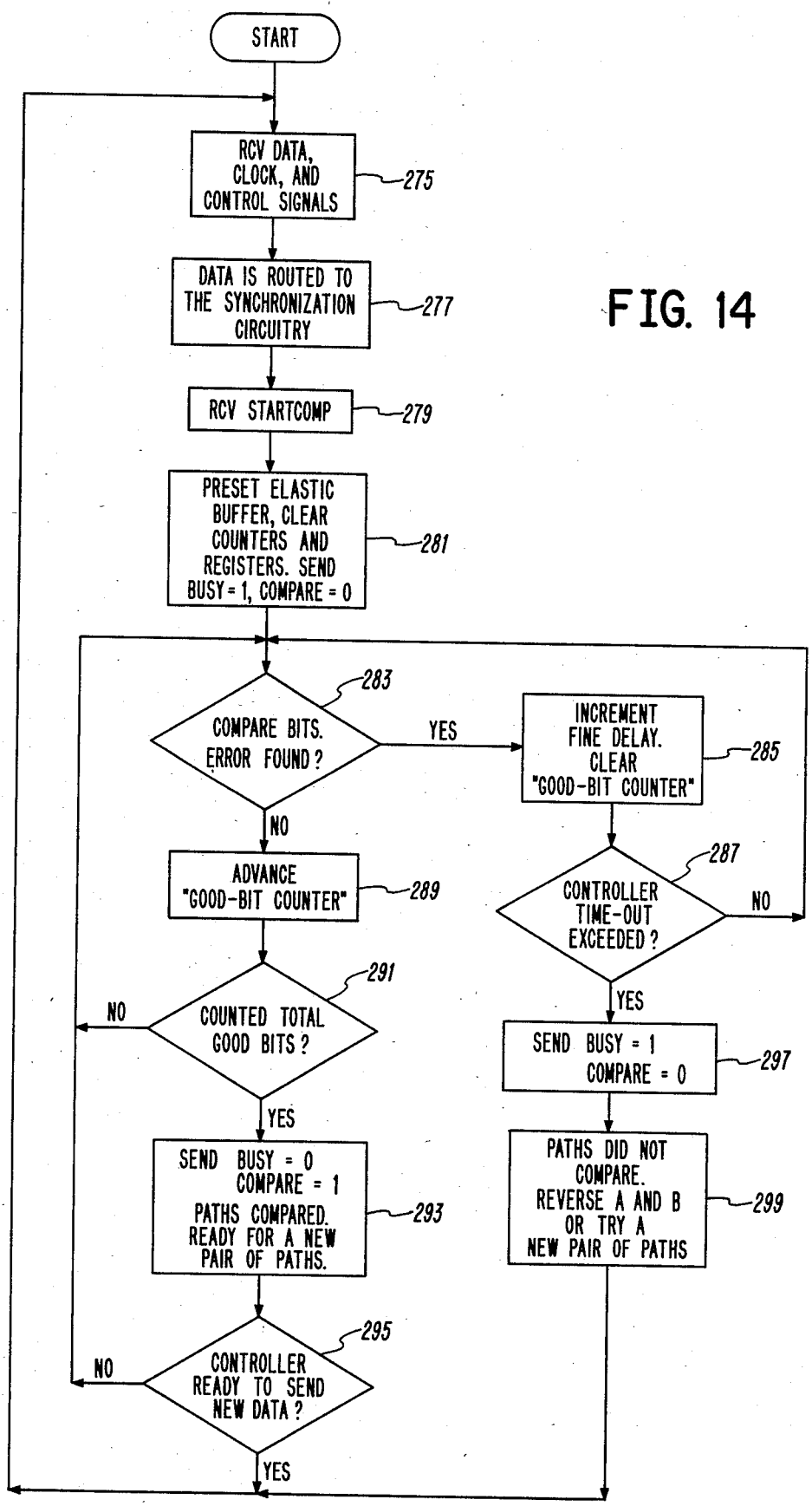

FIG. 12 provides a check of failed demultiplexer units in the main low speed portion;

FIG. 13 is a block diagram of the monitor 46 used to provide the bit by bit data checking in the previous figures; and FIG. 14 is a flow diagram used in providing the bit by bit comparison for each of the illustrated paths to ascertain whether or not there is a datapath failure involved.

DETAILED DESCRIPTION

Figure 1:
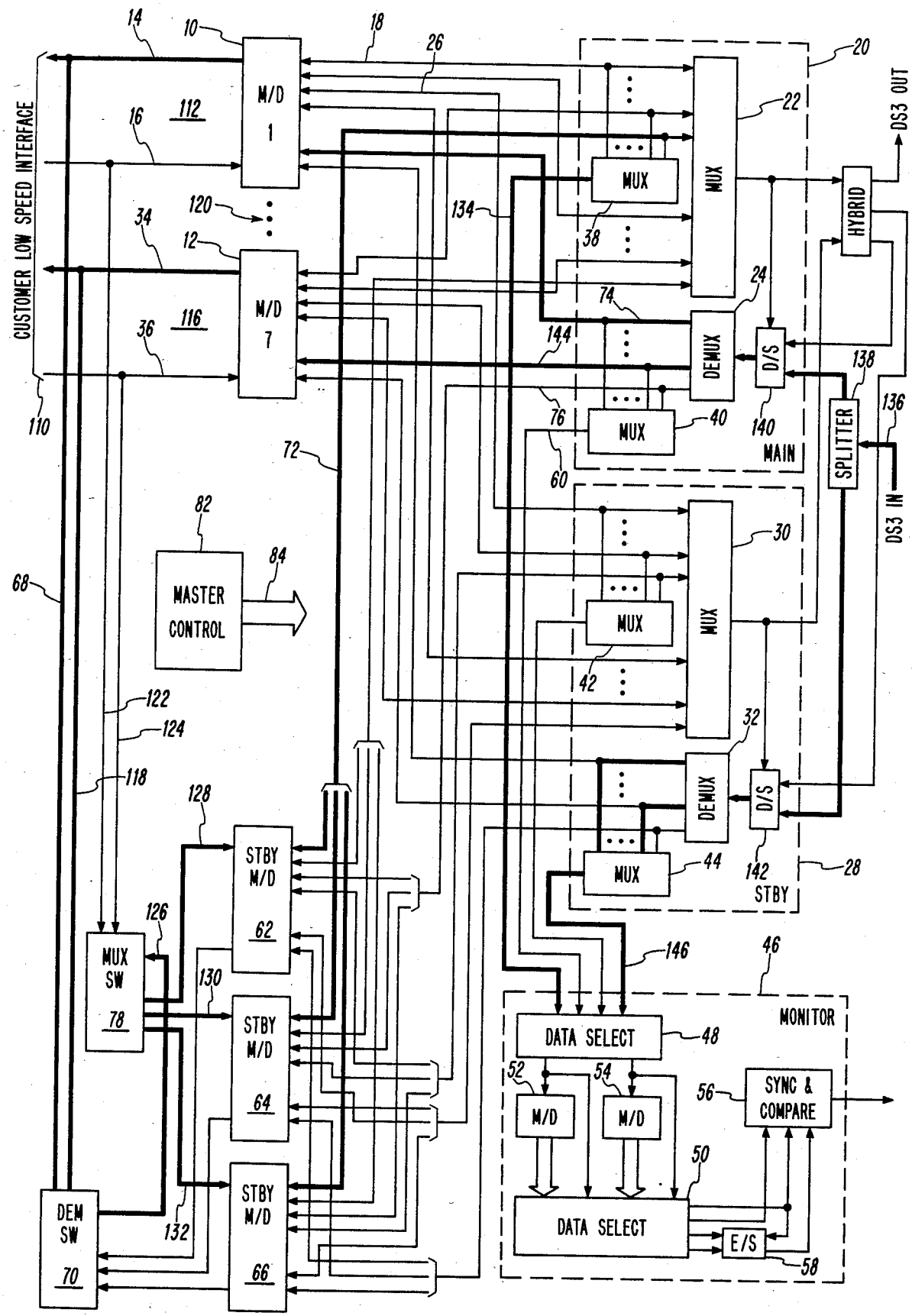
FIG. 1 illustrates a datapath used for routing data which is the first step in checking to see if there is a possible datapath error in the entire demultiplex portion of the composite muldem.

In FIG. 1 a plurality of low speed interface lines 112 to a customer are shown connected to a block generally designated as 10. These low speed lines typically are DS1, DS1C and DS2 format type data signals. A second set of wires 116 is supplied to a group block 12. The dash lines or dots 120 between blocks 10 and 12 indicate a plurality of other groups of multiplexer demultiplexer circuits for operating on further sets of customer low speed data. The set of wires or lines 112 is illustrated as two wires separately designated as 14 and 16 while the set of wires 116 is separately designated as leads 34 and 36. However, each of these separate designations again comprise a plurality of wires. The set of leads 14 are receive pairs for the customer while the set of leads 16 are transmit pairs. The sets of leads 34 and 36 have similar designations. The signals appearing on leads 14 are supplied to a demultiplexer switch 70 on a designated line 68. A designated line 118 supplies signals appearing on lead 34 to demultiplexer switch 70 also. Signals are also supplied to demultiplexer switch 70 from the intermediate sets of customer leads not illustrated. Leads 16 and 36 are connected via leads 122 and 124 to multiplexer switch 78. As shown by the heavy lines on leads 68 and 118, these signals are internally selected within demultiplexer switch 70 and routed on output lead 126 to a further input of multiplex switch 78 where they are selectively routed on one of leads 128, 130 and 132 to one of the standby multiplexers blocks or muldems 62, 64 and 66. Depending upon whichever one of the standby multiplexers from 62 to 66 receives the signal outputs, these signals are transmitted on the appropriate lead and are applied via composite lead 72 to the multiplex unit 22 and selection block 38 within block 20. While an arrow is shown on each of the appropriate leads connected to lead 72 as applied to the blocks 62 through 66, the arrows are only generally symbolic as signals pass in both directions on this set of leads. Although the signals on lead 72 are applied to multiplexer 22, they are not received by multiplexer 22. Rather, they are received by a multiplex or selection block 38 wherein they are selectively switched to an output lead 134 and thus to data select block 48 within the monitor block 46. Data being input to the muldem on a lead 136 is split in a splitter 138 and applied both to a three way data select block 140 within the main high speed muldem 20 and also applied from splitter 138 to a further data select block 142 within the standby high speed muldem 28. This input high speed DS3 signal is passed by the demultiplexing unit 24 to the various blocks 10 through 12 via leads such as 74 and 144 and to the remaining low speed multiplex blocks represented by designator 120. The split signal is passed from the data select block 142 through the demultiplexer 32 to the multiplexer or data selector 44 and output on a lead 146 to the data select block 48 within monitor 46. Within monitor 46, the signals are passed to the data select block 50 where they are passed both directly and through the elastic store 58 to the synchronization and compare block 56 where outputs are provided to the master control block 82 as each final set of comparisons of the data bits are made.

Figure 2:
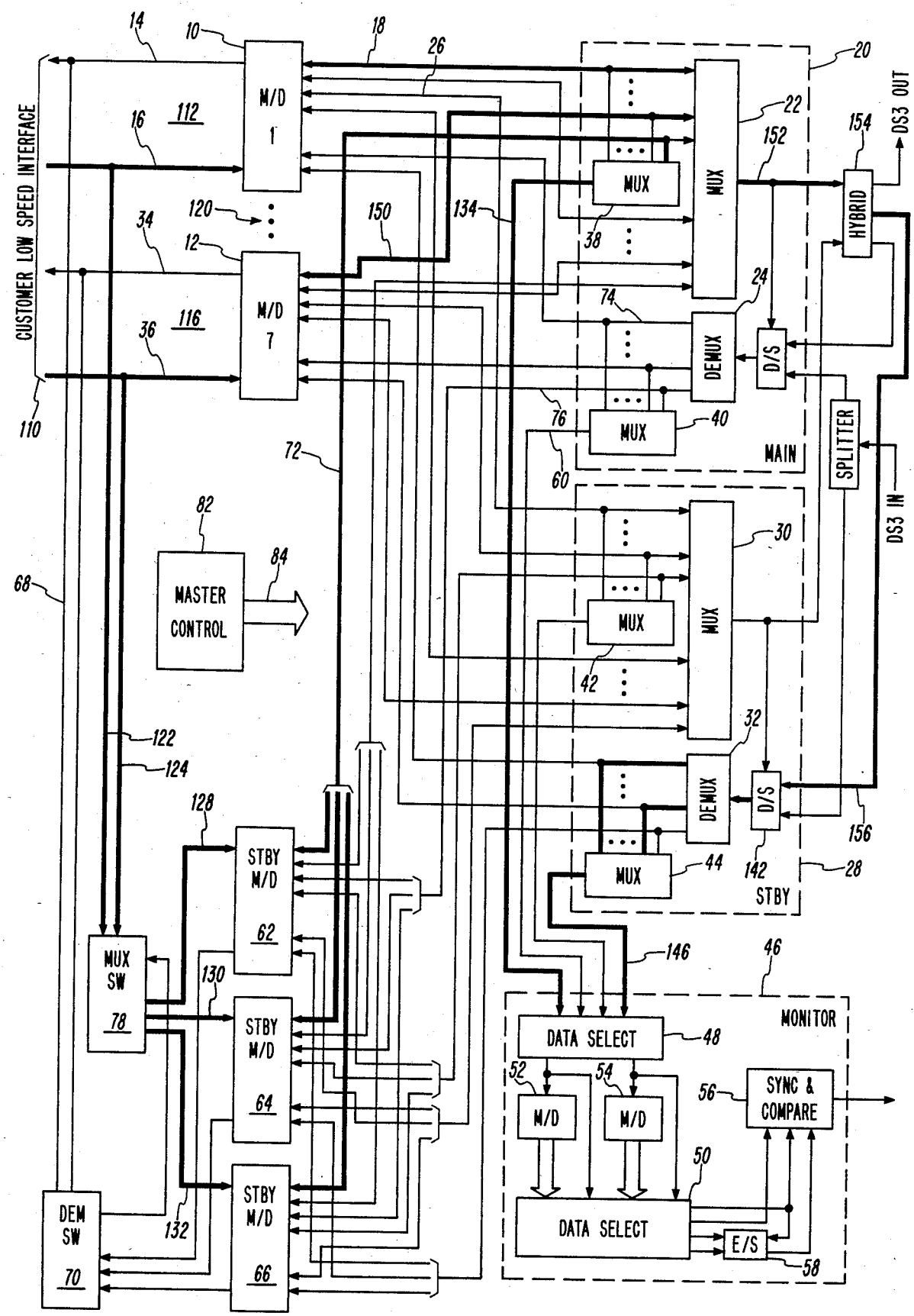
FIG. 2 illustrates the same check as FIG. 1 for the multiplex portions of the composite muldem.

In FIG. 2 many of the same numbers are used as appropriate and identical to those in FIG. 1. In addition, a lead 150 is illustrated connected between MUX 22 in block 20 and the group multiplexer block 12. Data is received on the sets of leads 16 and 36 by the low speed demultiplex block such as 10 and 12 and supplied to the multiplexer 22 and the data select multiplexer 38. Data is output on lead 134 to the data select block 48 within monitor 46 and also output from multiplexer 22 on lead 152 to the hybrid splitting device 154 to be output on the DS3 output line. In addition, this signal is supplied from hybrid unit 154 on a lead 156 to the data select block 142 where it is returned through demultiplexer 32 and data select unit 44 and lead 146 to the data select unit 48 within monitor 46.

Figure 3:
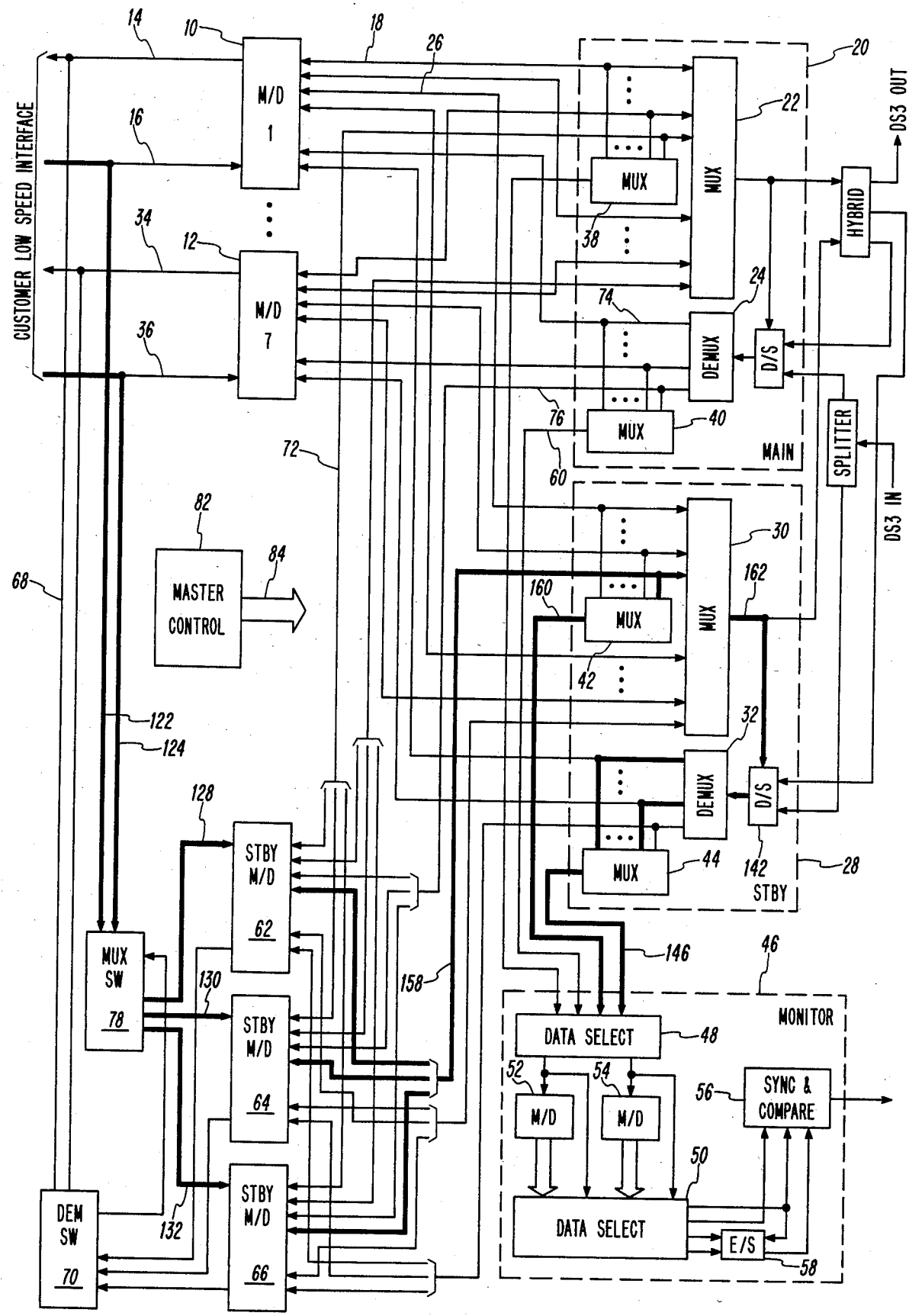
FIG. 3 illustrates a test of the high speed standby unit.

In FIG. 3 the received signals in addition to the normal datapath through the main units are supplied through leads 122 and 124 to the multiplex switch 78 where they are selectively output on one of leads 128, 130 and 132 to one of the standby units 62 through 66. The signals are then output on one of the leads to the multiplex data and clock leads or wires 158 supplying signals to multiplex unit 30 as well as the multiplex or select switch block 42. These signals are output from the select block 42 on a lead 160 to an input of data select block 48 within monitor 46. The signals are also passed through the multiplex unit 30 to an output lead 162 where they are returned through the data select block 142, demultiplexer 32, the multiplex switch 44 and on lead 146 to a further input of the data select block 48 in monitor 46.

Figure 4:
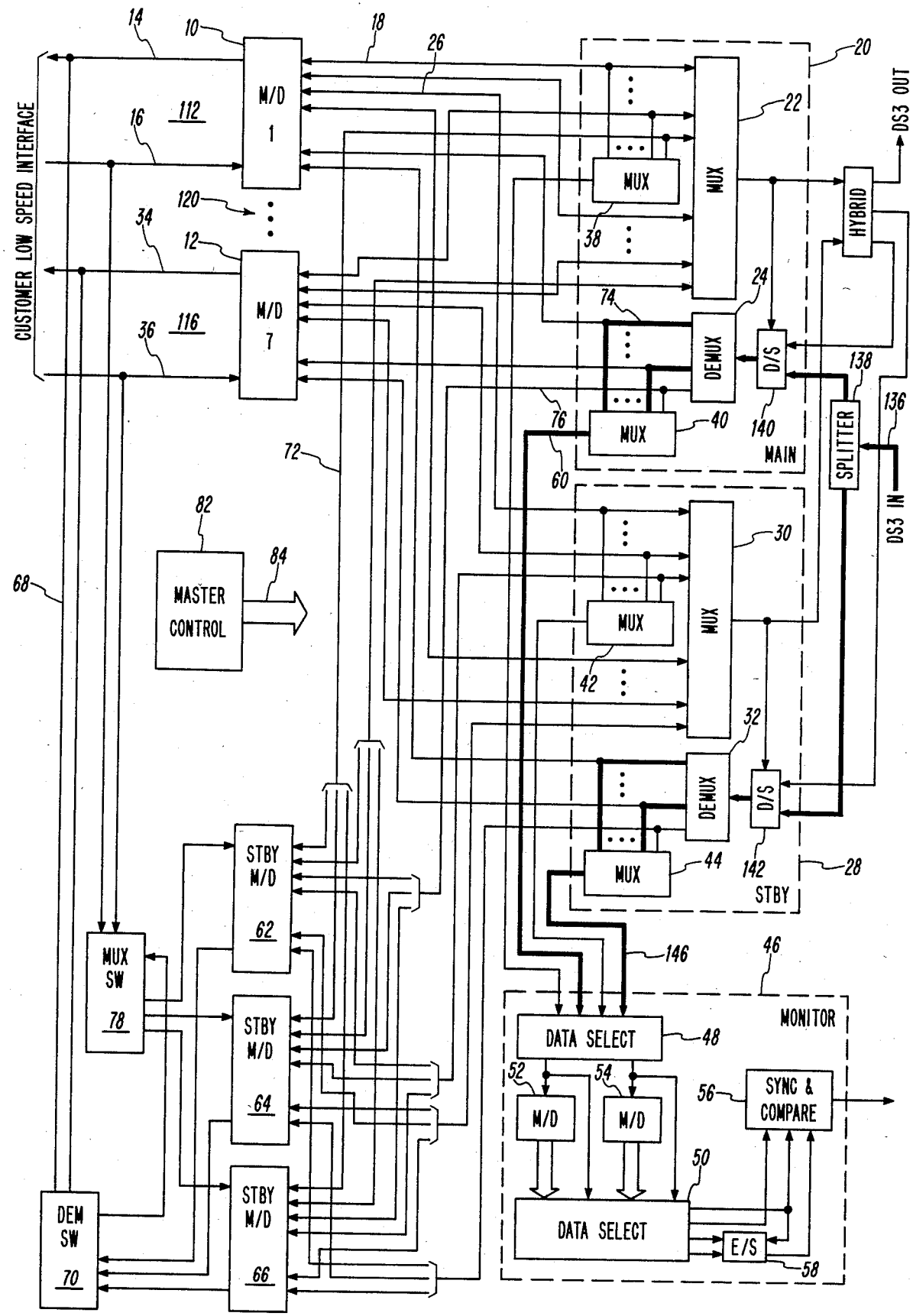
FIG. 4 illustrates a method of checking the primary high speed demultiplexer.

In FIG. 4 the same numbers are used as appropriate in the previous figures. As illustrated, the DS3 signals are input on lead 136 to the signal splitter 138 and applied both to the data select block 140 and thus to demultiplex 24 in the main high speed muldem and to the data select block 142 in the standby muldem. As illustrated, these signals are being passed from demultiplex 24 through the multiplex 40 and on line 60 to the data select block 48. Likewise, the signals from demultiplex 32 are passed through the multiplexer or select block 44 to data select block 48 via lead 146. The signals are checked within monitor 46 in a manner substantially identical to that of the previous figures.

Figure 5:
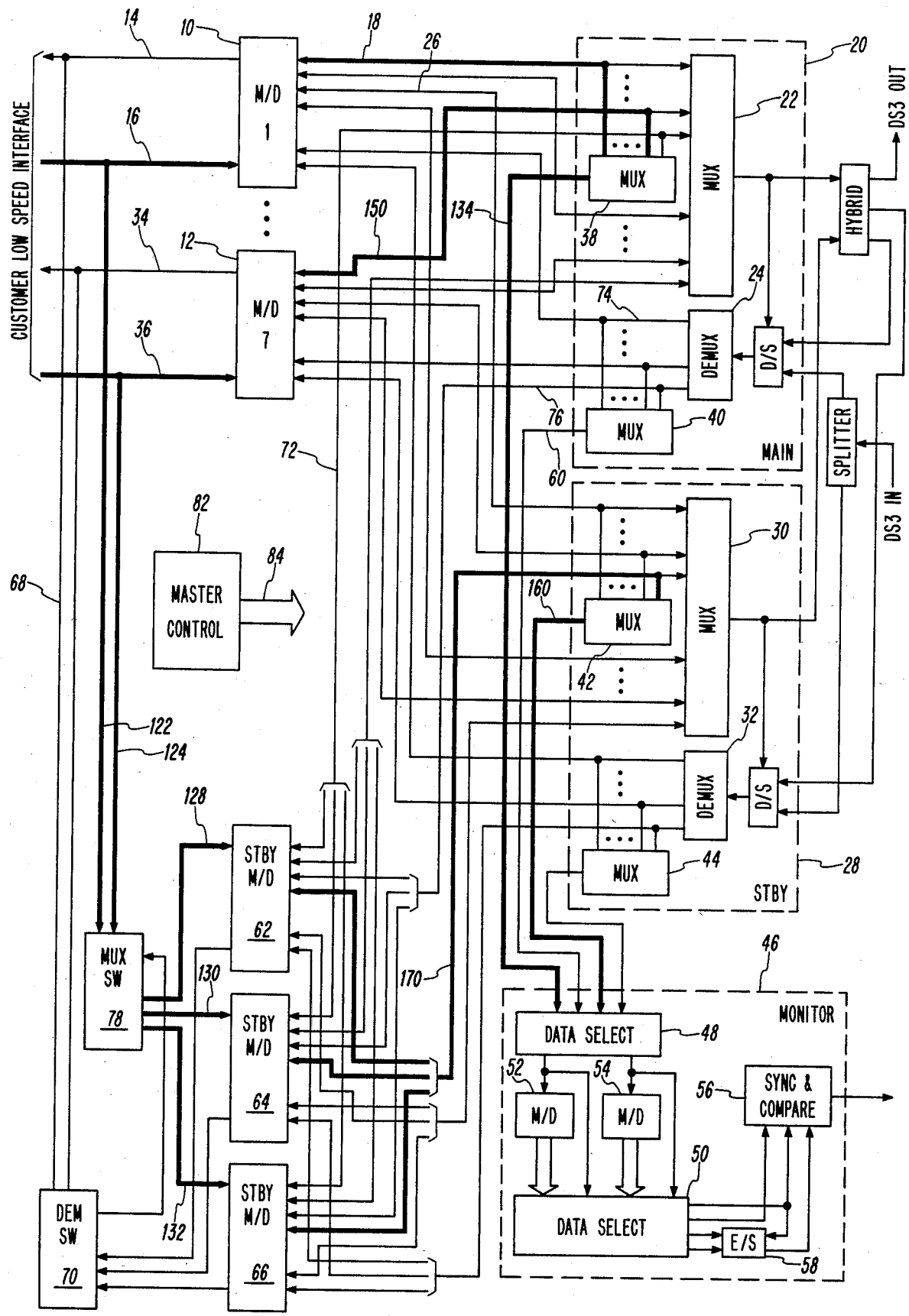
FIG. 5 illustrates a datapath used to check for failure of a specific low speed primary group of multiplex signals.

In FIG. 5 the signals that are normally transmitted to the DS3 output from the main multiplexer 22 are supplied to multiplexer 22 from each of the main low speed interfaces or blocks such as 10 and 12. In addition, these signals are supplied to multiplexer or select block 38 and supplied from there on line 134 to data select block 48 within monitor 46. The signals being received on leads 16 and 36 from the customer by interface units or blocks 10 and 12 are further supplied on leads 122 and 124 to the multiplex switch 78. Within multiplex switch 78, the signals are selectively output on leads 128, 130 and 132 to the appropriate standby interface units 62, 64 and 66 depending upon which of the interface units is being checked at that moment. These signals are returned by these standby interface units via a lead 170 to the multiplex or select block 42. Within block 42, a specific signal is selected for that particular monitored check and output on lead 160 to the data select block 48 within monitor 46.

Figure 6:
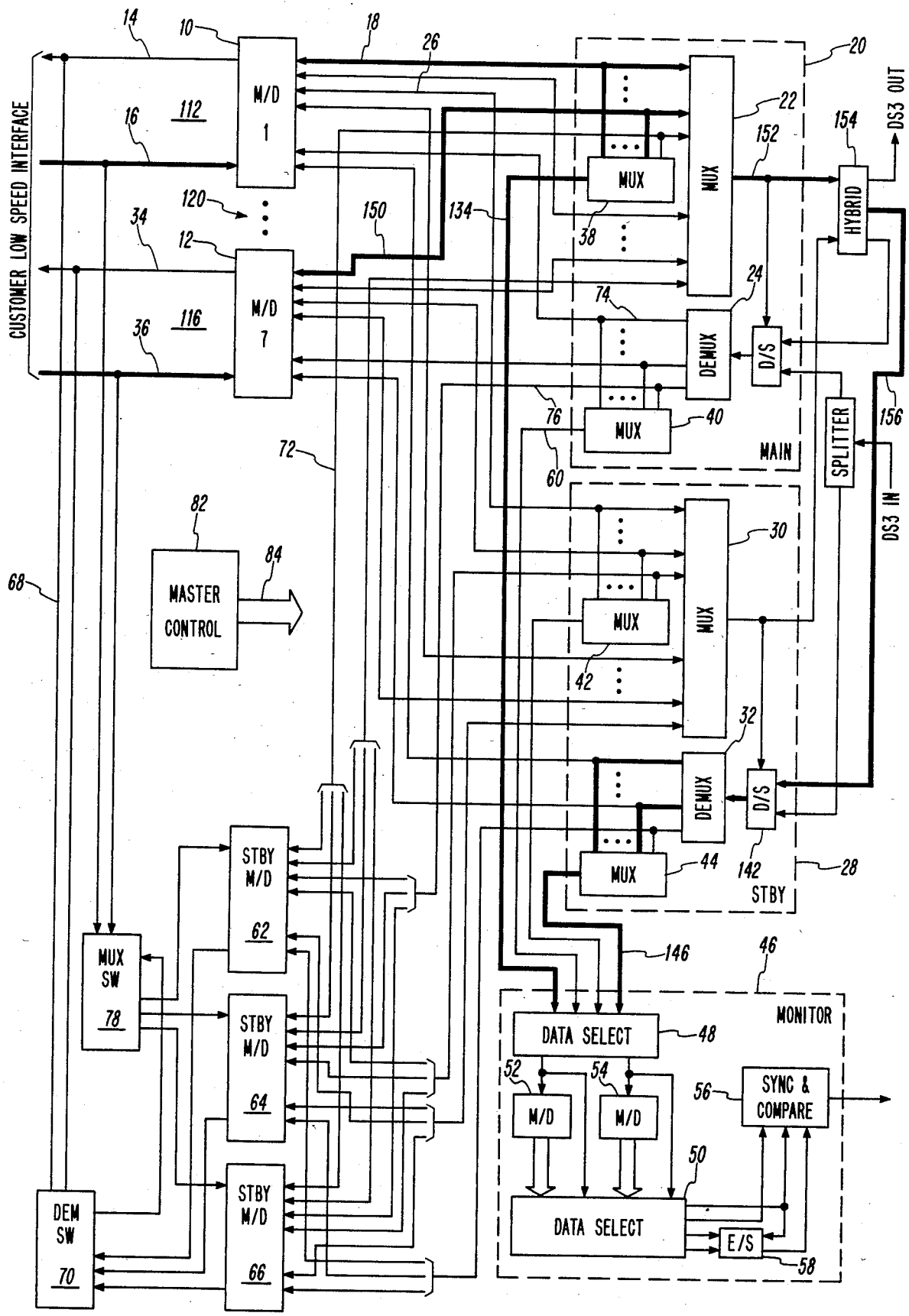
FIG. 6 illustrates the datapath used in a second check of the group paths to provide a further indication where the failure occurred in the group.

In FIG. 6 the signals that are received on the lines 16 and 36 from the customer are passed through the appropriate low speed interface units 10 and 12 to multiplexer 22 via leads 18 and 150. These signals are also passed to the multiplex unit 38 and supplied via lead 134 to the data select block 48 within monitor 46. At the output of multiplexer 22 in the main high speed unit or block 20, these signals are split in the hybrid unit 154 and passed via lead 156 to the data select block 142 within the standby unit 28. At this point, they are passed via demultiplexer 32 and the data select or multiplexer 44 to data select 48 within monitor 46 via lead 146.

Figure 7:
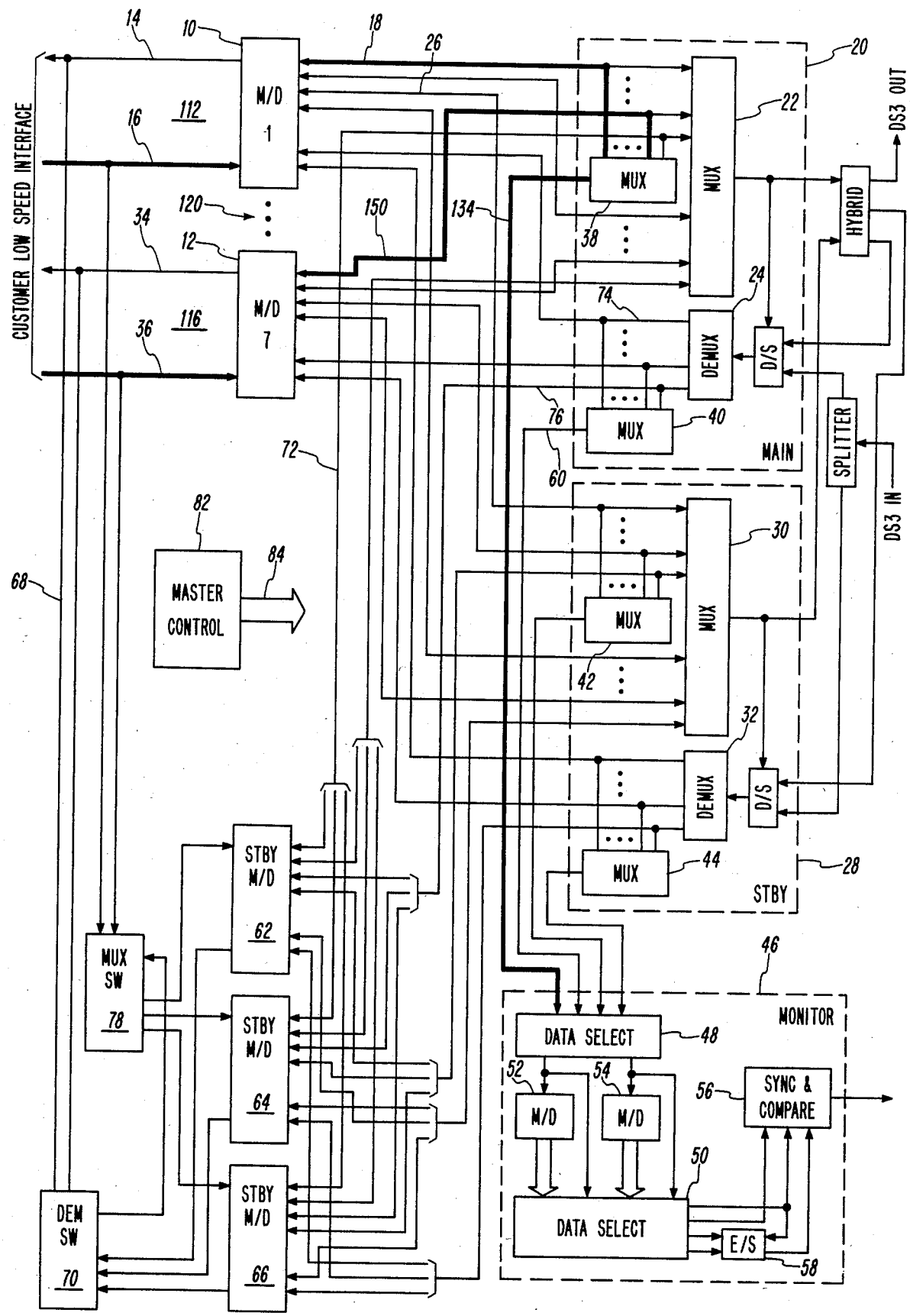
FIG. 7 is a datapath used to check one of the four paths specific to the monitor itself.

As indicated previously, FIG. 7 uses the same numbers as appropriate where used in previous figures. In this datapath check, the path of signals being supplied through the circuitry includes the data select block 38 in the main high speed interface. Block 38 and its associated circuitry, as supplied to the monitor 46, is being checked. Thus, the signals being received from the customer are passed via leads 18 and 150, etc., to the data select or multiplex unit 38 and output on lead 134 to the data select block 48 in monitor 46. The data select block 48 has the capability of applying the same signal and clock to both muldems 52 and 54 within the monitor 46 and the signals are compared in the same manner as they would have been if they had been received on different incoming leads.

Figure 8:
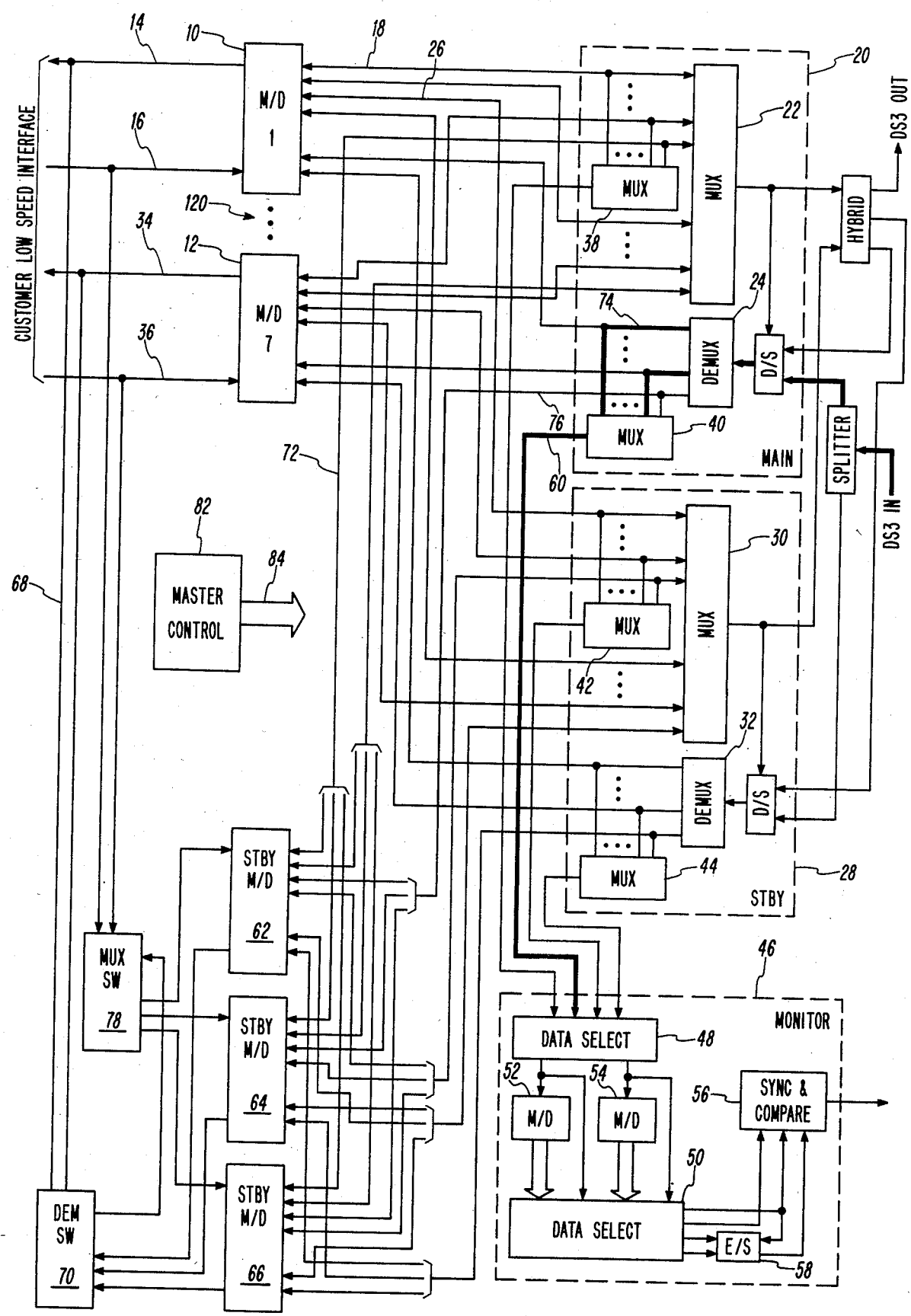
FIG. 8 is a second datapath used to check the monitor itself.

In FIG. 8 the path from the demultiplex portion of the main high speed unit to the data select 48 within monitor 46 is being checked. Thus, all of the signals being supplied by demultiplexer 24 to the various low speed interface units 10 through 12 are being supplied on a selected basis through data select block or multiplex unit 40 to lead 60. Lead 60 is connected to the data select block 48 within monitor 46 and within the data select block, the signals are then applied to block 50 or supplied to the two muldems 52 and 54 for certain data types. The remaining circuitry within block 46 is used to check for data identity.

Figure 9:
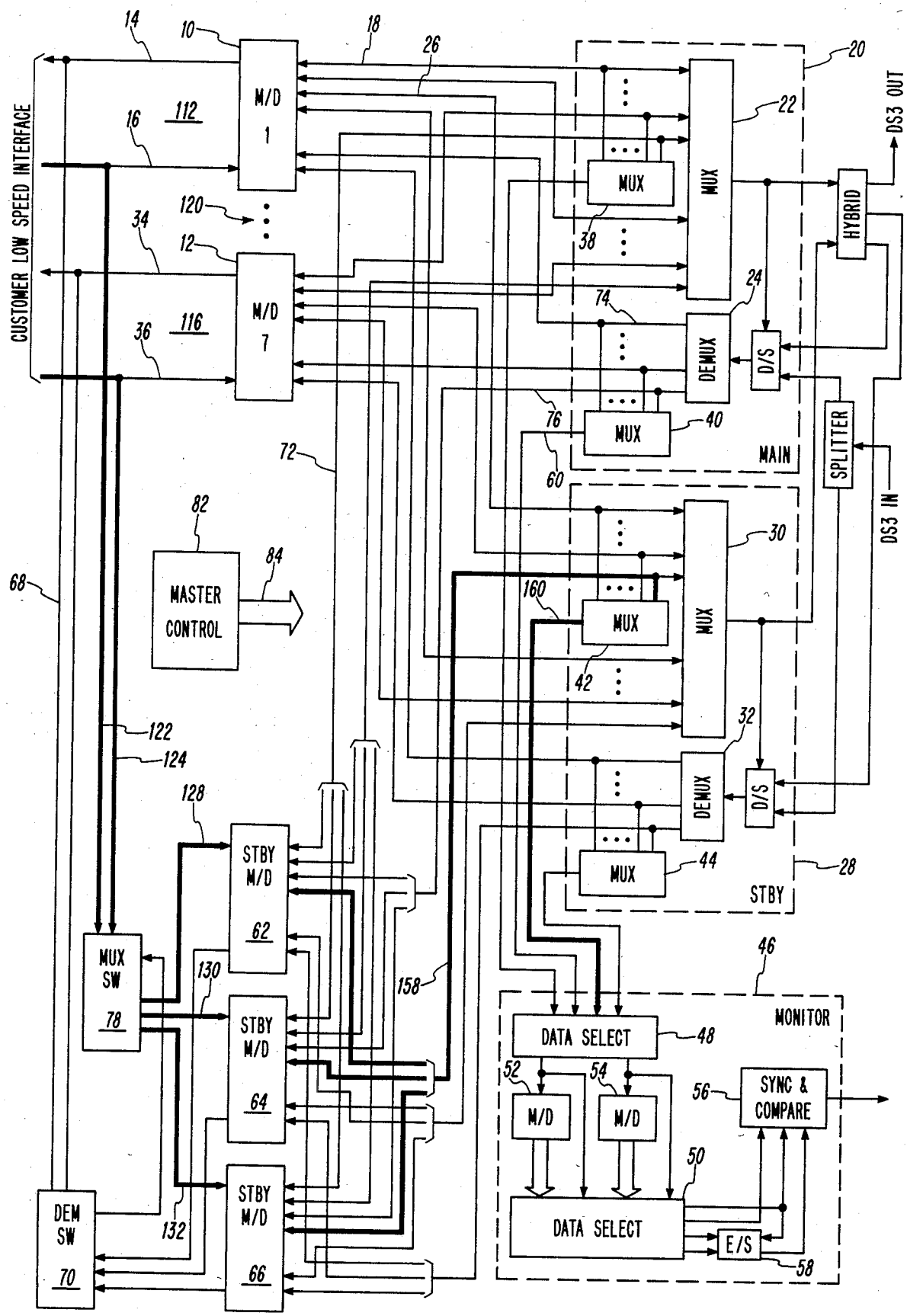
FIG. 9 is a third path used to check the monitor itself.

FIG. 9 illustrates the monitor path check for the third data line coming into the monitor 46 and, in this version, the incoming information from the customer received on the lines 112 and 116 are supplied on leads 122 and 124 to the multiplex switch 78. The signals are selectively output on one of leads 128, 130 and 132 to the appropriate standby muldem 62, 64 and 66. The signal is then output and selectively applied through the plurality of leads 158 to the multiplex or select switch 42. Each of these signals is output at appropriate times on lead 160 and again multiply applied or split within data select block 48 of monitor 46 in a manner similar to that previously mentioned.

Figure 10:
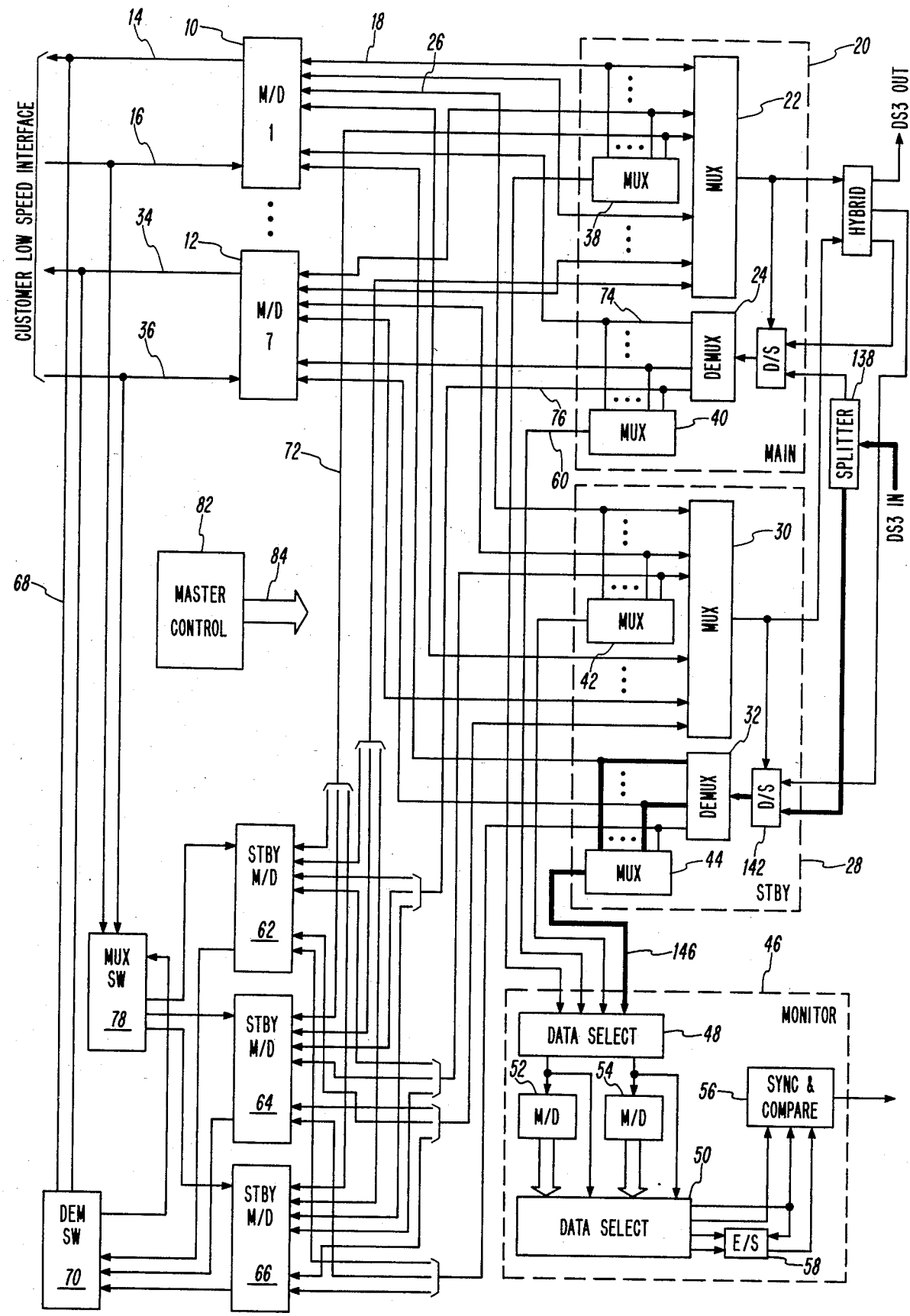
FIG. 10 is a fourth path used to check the monitor itself.

In FIG. 10 the final or rightmost lead 146 of the input datapaths to monitor 46 is being checked. In this path, the information which is input on the DS3 line to splitter 138 is output to the data select block 142 from splitter 138 as well as being applied to the main demultiplexer 24. The output of data select block 42 is supplied to demultiplexer 32 where it is output to the multiplexer or selection block 44. As previously indicated, this signal is then supplied on lead 146 to data select block 48 where it is split and applied to the two muldems 52 and 54 for a comparison by block 56.

Figure 11:
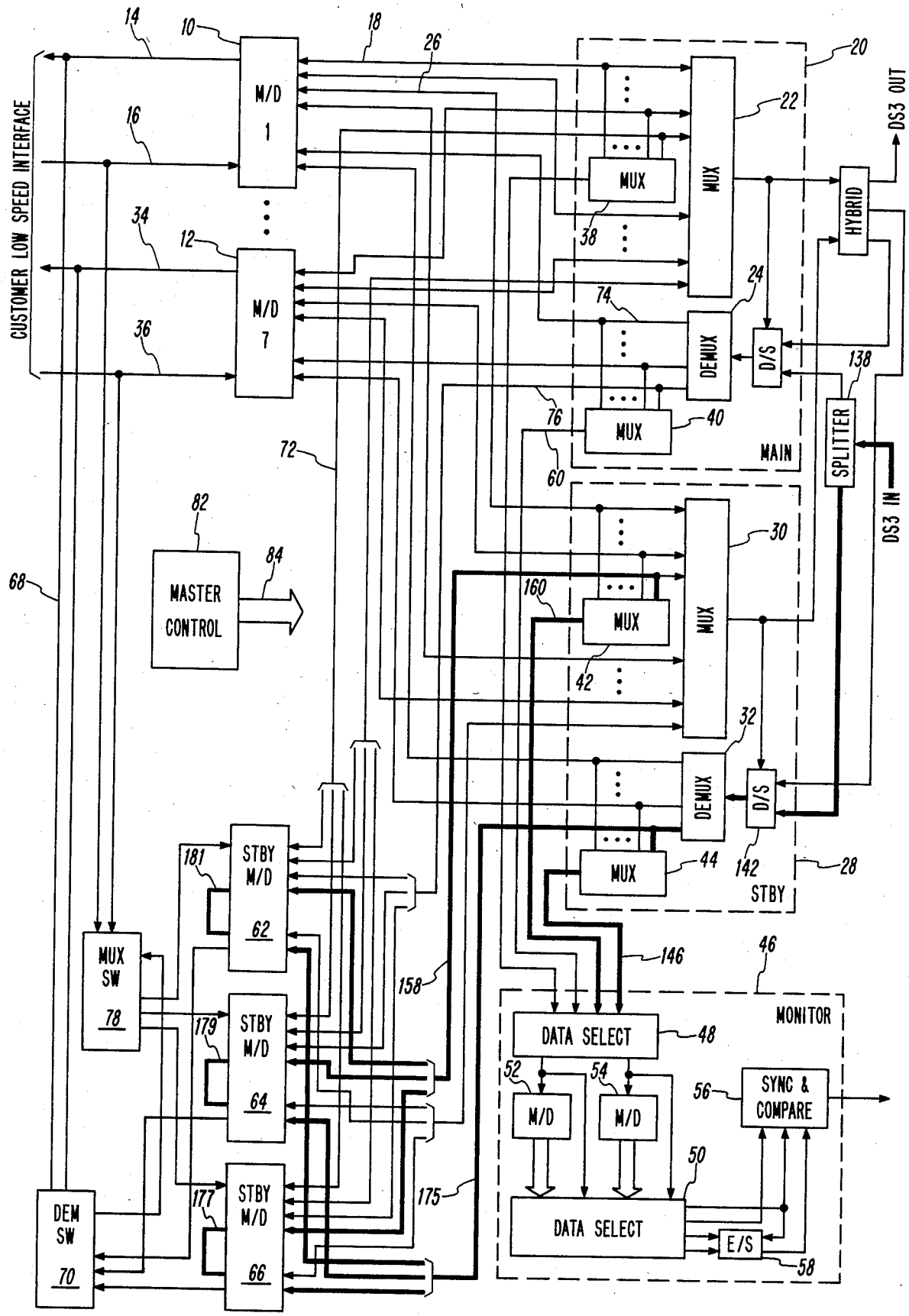
FIG. 11 is an overall compare of the low speed standby units.

In FIG. 11 the low speed standby circuitry is being checked so that the incoming signal on the DS3 line is again split in splitter 138 and applied not only to the main demultiplexer 24 but to the standby demultiplexer 32 via the data select block 142. The signal is output from demultiplexer 32 and supplied through the multiplexer or select block 44 and input to data select block 48 of monitor 46 via lead 146. In addition, these signals are supplied on a set of leads 175 to each of the standby multiplexers 62 through 66 as appropriate, where it is looped back in one of the loopback leads 177, 179 or 181 and returned via the plurality of leads 158 to the multiplex unit or data select block 42 where a specific signal is selected and returned via lead 160 to the data select block 48 within monitor 46.

FIG. 12 illustrates the checking of a specific group such as the group 7 in block 12 with the data being received from the high speed main demultiplexer 24 and being passed on lead 60 to the data select block 48 of monitor 46. In addition, the signals from a specific muldem such as unit 12 have the output signals from lead 34 passed on lead 118 to the demultiplexer switch 70. Within switch 70, the signal is selectively supplied to lead 126 and returned to multiplex switch 78. Within switch 78, the signals are rerouted selectively to one of the standby muldems 62 through 66 where the signals are output on the appropriate leads and passed through the plurality of wires 158 to the input of the multiplexer switch or selection unit 42. Signals are then output from select unit 42 on lead 160 where they are supplied to the data select block 48 of monitor 46.

In FIG. 13 a block diagram is illustrated of the monitor 46 of the previous figures. The data select block 48 includes the bus bar input supplying signals on a bus to each of the blocks 200 and 202. (Although there is no direct correspondence between FIG. 13 and block 46 of the previous figures, the blocks 200 and 202 include blocks 48, 50, 52 and 54 of the previous figures.) In addition, a delay select lead 204 and a start compare lead 206 is illustrated. The output of the path B block 200 is output on a pair of leads 208 and 210 to the N elastic buffer 212. An out-of-frame signal (when processing DS1 and DS1C type signals) is output on a lead 214 to a subframe/majorframe detector 216. A similar out-of-frame signal is supplied on lead 218 from block 202 to the detector 216. The block 202 has an output clock A signal supplied on lead 220 and an output data signal on lead 222. The signals from data leads 208 and 222 are supplied to a data change detector block 224. A dual signal output of block 224 is supplied on a pair of leads 226 to a status buffer block 228 which has a plurality of outputs on a bus 230 returning to a microprocessor. A dual signal output of the subframe/majorframe detector 216 is supplied on a pair of leads 232 to the block 228. The clock signals appearing on leads 210 and 220 are both supplied to a clock activity detector 234 which supplies outputs on a lead 236 to block 228. The start compare signal of lead 206 is supplied to the buffer 212, the data change detector or block 224 as well as to a coarse delay block 238, a fine delay block 240, a good bit counter and controller 242 and a fixed delay block 244. The block 244 also receives data signals on lead 222 and supplies output signals on a lead 246 to an error detector exclusive OR gate 248. An output of OR gate 248 is supplied on a lead 250 to the good bit counter 242. The clock signal on lead 220 is supplied to the elastic buffer 212 as well as to the good bit counter 242. The data signals from elastic buffer 212 are supplied to coarse delay block 238 which outputs this data to the fine delay block 240 where it is passed and output to the OR gate error detector 248. The data signals on lead 222 are supplied to the fixed delay block 244 which, as previously indicated, outputs these delayed signals to error detector 248. The good bit counter and delay controller 242 supplies count signals to the delay block 240 as well as to the status buffer 228.

The flow diagram of FIG. 14 gives a flow chart for data comparison where at the start a block 275 checks to see that data, clock and control signals have been received. The data is appropriately routed to the synchronization circuitry in accordance with block 277 and then the compare procedure is started according to block 279. At this time block 281 presets the elastic buffer, clears the counters and registers and indicates that this portion of the system is either busy or has compared. A decision block 283 ascertains whether or not an error is found in a particular comparison. If there is an error found, an increment fine delay signal is used in block 285 to increment the fine delay and clear the good bit counter. At this time, the controller timeout is checked to see if the time has been exceeded by decision block 287. If it has not been exceeded, the next two bits are compared by decision block 283. If an error is not found, the good bit counter is advanced according to block 289 and decision block 291 ascertains whether or not the total good bits have been counted. If not, a comparison is again obtained. If the proper number of bits in a path have been counted, block 293 indicates a compare and a readiness for new data. A decision is then made in decision block 295 as to whether or not the controller is ready to send new data. If it is not ready, the comparison is again performed but if it is ready, it returns to block 275. Meanwhile, if the controller timeout has been exceeded by decision block 287, a busy signal is set to "1" and a compare signal is set to "0" by block 297. If the paths did not compare, datapaths A and B are reversed or a new set of paths are tried according to block 299. Again, the system returns to block 275 to test a new path.

OPERATION

As previously indicated, this invention is utilized in conjunction with a composite muldem of a design incorporated in copending patent applications. The design is such that there is a homogeneous frequency or common reference point within the muldem for all signals transmitted therethrough. This allows a bit by bit testing of the signals to determine the operational status of the time division multiplexer. This is accomplished in one embodiment by demultiplexing the high speed DS3 signals to DS2 signals within the muldem. All of the switching is accomplished at the DS2 level and then the signals are output to the customer, after further signal processing, in either the DS2, DS1 or DS1C signal format. The present concept performs real time testing of on-line units using real data (the data being transmitted through the unit) and not an internally generated test pattern. The elimination of the internally generated test pattern reduces the amount of circuitry and also reduces the possibility that a data pattern generated by a pseudorandom generator could pass a particular test whereas the data from the "real world" would exhibit no such pre-conceived form of data patterns. In a North American muldem, the basic higher order input/output frequency referred to above as DS3 is actually a 44.736 megabit per second signal. The lower order input/output signals supplied to the customers have respective frequencies of 1.544 megabits per second for DS1 format, 6.312 megabits per second for DS2 format and 3.152 megabits per second for DS1C format. In observing FIG. 1 of the drawings, it will be found that all of the signals between the low speed interface units such as 10, 12, 62, 64 and 66 and the high speed muldems 20 and 28 operate at the 6.312 megabit per second frequency. Thus, all signals must pass through this step. If all testing is accomplished at this frequency, then a single monitor such as 46 can be used to provide the testing. If a master control such as 82 is used in conjunction with extra switches built into the muldem, the data can be routed in various paths and the results of different paths compared within the monitor 46 and deductive reasoning may be utilized to establish that given paths are either operating satisfactorily or unsatisfactorily. With enough testing, the muldem can be completely tested for operability and if any part is not operating satisfactorily, that particular portion can be reasonably well isolated using the deductive reasoning combined with the results of each of the tests.

As a visual aid in understanding the inventive concept, the datapath leads involved in the test cycle illustrated by a given figure are made wider (heavy or bold) to differentiate them from leads used for other purposes at that time. Thus, while each of FIGS. 1 to 12 are substantially identical, different leads are made wider and some designators are used only in Figures where the designated items are discussed.

FIG. 1 illustrates a first testing path which provides a high level demultiplex signal comparison. The low speed outputs DS1, DS1C and DS2 are compared one signal at a time against the high speed input after both are conditioned to a common (DS2) frequency. As will be noted, the input data is brought in on lead 136 and supplied through the splitter 138 to both the main high speed muldem 20 and to the standby muldem 28. The output of demultiplexer 24 is supplied to each of the groups from 10 to 12 and output to the customer. Switching is utilized via the demultiplex switch 70, the multiplex switch 78 and each of the standby muldems 62 through 66 to selectively return these signals via line 72 to the multiplexer or select block 38 and then via lead 134 to one input of the monitor 46. The input DS3 signal is thus demultiplexed to seven DS2 signals, routed to the appropriate low speed interface, and then remultiplexed by the standby interface units back to the DS2 level signal before being selectively applied via select unit 38 to the monitor 46. This input DS3 signal on lead 136 is also demultiplexed via demultiplexer 32 within standby unit 28 and applied on a selective basis through multiplexer 44 to lead 146 which inputs signals to monitor 46. The monitor 46 can then compare these data bits on a bit by bit basis within the monitor. The signals which are passed completely through the muldem and then returned through the standby units will be delayed in time as compared to the signals which merely had to pass through the standby unit 28. Thus, the set of signals appearing on lead 146 will be supplied to the elastic store block 58 where they are delayed a time period such that they can be directly compared within block 56 and an output supplied to master control 82 as the testing of each of the seven groups of signals is completed.

As will be realized by those skilled in the art, the group interface modules 10 through 12 condition the output signals for transmitting data to the customer. These interface units in some instances will keep the data at the DS2 level but in other cases (dependent on customer requirements) will reformat the data to the DS1 or DS1C format. If the signals compare favorably for each of the seven groups, it can be reasonably assumed that the entire demultiplex portion of the muldem is operating satisfactorily.

The datapaths illustrated in bold lines in FIG. 2 perform substantially the same testing of the high speed multiplexer data paths. In this case, the low speed customer data is input in the normal manner via the group units 10 through 12 and supplied to the multiplexer 22 in high speed muldem 20. Once these signals reach the output on lead 152, they are supplied to a hybrid unit 154. The signals which have been processed in a normal manner are then returned via the lead 156 to the standby unit, demultiplexed by demultiplexer 32 within the standby unit and then supplied one at a time through multiplexer 44 to the monitor 46 via lead 146. The customer data is also supplied directly from the customer via leads 122 through 124 to the multiplex switch 28 where they are selectively applied to the appropriate standby multiplexer 62 through 66. The particular unit, of the set 62 through 66, which is selected depends upon which of the customer data formats is being tested as explained previously. The data is output from the appropriate standby low speed interface unit and supplied via lead 72 to the multiplexer 38 where it is selectively output on lead 134 to a further input of the monitor 46. Again, the master control 82 knows which of the two signals is going to be delayed the most and thus it routes the signals from lead 134 to the elastic store 58 so that these signals may be delayed long enough to provide a real time bit by bit compare with the later arriving signals from lead 146. As before, a signal is passed from the sync and compare block 56 back to master control 82 as each test is completed. If all of the tests indicate satisfactory operation from the paths shown in FIGS. 1 and 2, it is reasonably certain that the composite muldem is operating satisfactorily. However, to simplify design, each of the further tests will be performed by sending data via the paths shown in FIGS. 3 through 12. If the tests using the datapaths of FIGS. 1 and 2 illustrate that one or more of the comparisons provided unsatisfactory results, then the following datapath test will enable a more detailed isolation of which portion of the muldem is producing the unsatisfactory operation.

It should be noted that the path 1 and path 2 tests (FIGS. 1 and 2) utilize the switch modules, the standby group modules and the standby high speed muldem module for the testing. The only portion of this circuit which was dedicated solely for testing is module 46. The referenced prior art patents used an entire shelf of equipment to perform a test which only approximated the above test.

It should also be noted that the results of the above two tests can, in many cases, isolate the problem such as the following reasoning will illustrate. If, in both the tests of FIGS. 1 and 2, all of the data from Group no. 1 provides a failure of compare, it may be reasonably assumed that there is a problem with power to the Group no. 1 module or that it has some other major problem. Likewise, as will be ascertained from a later discussion of operation of the monitor unit itself in conjunction with FIG. 13, if any data is passed through the Group no. 1 muldem 10, the testing can ascertain whether (1) the output of the muldem had a clock signal but no data signals, thereby indicating that a portion of the muldem is working or (2) clock signals and changing data level signals but no frame signals thereby indicating that other portions of the muldem have failed.

The previous tests passed data through all of the major components of the composite muldem except for the multiplex side of the standby high speed unit. In FIG. 3, the data being received from the customer is also routed through the multiplex switch 78, the appropriate standby low speed interface unit and supplied to both the multiplexer 30 within standby unit 28 and to the multiplex select switch 42. The data is output on lead 160 to one input of the monitor and then routed through the multiplexer 30 and returned via data select block 142 and the demultiplexer 32 to the data select block 44 where it is supplied to the monitor on lead 146. Thus, for this test, the data supplied to the standby unit is compared with the data from the standby unit after being passed through all of the major components. Thus, the data can be compared on a bit by bit basis by the compare circuit 56 after the signals on lead 160 are delayed by other circuitry shown in FIG. 13.

By deductive reasoning, it will be realized that, (1) if the previous tests indicated that all of the comparisons were satisfactory and (2) if in the present test the results are unsatisfactory, then the datapath problem must occur in the standby high speed multiplexing unit. If there is a problem with only one of the channels, the problem is probably in one of the select switches within the multiplexer 42 or some such similar minor problem.

The datapath test illustrated in FIG. 4 is used to check the translation between the DS3 input signals and the demultiplex operation within each of the high speed muldems. Thus, the signals are compared after being supplied through each of the demultiplexers 24 and 32 in the main and standby high speed units. If the tests of FIG. 3 were satisfactory and the tests of FIG. 4 are unsatisfactory, this would indicate that the problem was in the demultiplex section of the main high speed muldem.

The datapath in FIG. 5 is used to check the data translation from the multiplex side of the lower order or low speed interface units. In other words, this is checking the translation of the signals from the common or homogenous frequency to the customer frequency. Thus, data is compared as output by the multiplexer 38 before being translated and then is routed, as shown, on the heavy lines via each of the low speed main interface units 10 through 12. The signal is returned via the MUX switch 78 and the appropriate standby low speed interface unit to the lead 170 where it is returned to the monitor 46 via the data select 42. The original signals supplied to the monitor 46 on lead 134 are delayed in elastic store 58 so that the compare circuit 56 can compare the data bits being input on a bit by bit basis. The test of FIG. 5 would normally be used to select a particular multiplex section of an individual group for pinpointing a data failure path in response to an indication in the test of FIG. 1 showing that there was a failure problem somewhere in the system.

The datapaths of FIG. 6 are used to check the translation from the homogenous intermediate DS2 level frequency to the DS3 output of the high speed main muldem. This test is a substantially complementary test process as compared to that in FIG. 4 which tested the demultiplex portion of the high speed unit.

The datapath tests of FIGS. 7 through 10 are used to check the individual data select blocks 38, 40, 42 and 44 and their interconnecting circuitry. Specifically, FIG. 7 provides a route for checking the MUX or data select 38 by supplying the signals output from 38 to one of the inputs of data select 48. The data select block 48 is capable of supplying this signal to the two muldems 52 and 54 or to 50 directly so that it is compared on a bit by bit basis within the compare circuit 56. In this case, the elastic store 58 would be set by control 82 such that it would not delay the signal. This check uses low speed data as received from the customer and checks to see primarily whether or not any data/clock is being received on each of the sets of group inputs. Such a check allows for a further definition of datapath faults in the operation of the internal switching within MUX 30 and its associated lines as connected to the low speed interface units 10 through 12.

FIG. 8 uses basically the same concept as FIG. 7 except that it checks the circuitry using high speed data and checks the connections relative the data select block 40. The same principle of dividing the signal within data select block 48 to provide the comparison is used.

FIG. 9 uses a concept similar to that of FIG. 7 except that after it obtains data from the customer, it routes the data through the standby low speed interfaces and its associated circuitry with the multiplex select block 42.

Finally, the datapath of FIG. 10 uses high speed data through the standby muldem as illustrated to test the final monitor input circuit path and its associated data select muldem 44.

One of the copending applications utilizes loopback concepts in performing the inventive concept. FIG. 11 illustrates a datapath test mode which checks the loopback circuitry illustrated as 177 through 181 in Figure 11 for returning the signals through the low speed interfaces 62 through 66. As illustrated, the high speed input data is demultiplexed and sent to the data select 48 within monitor 46 and then it is passed through the low speed interface units on a selected basis and returned through the loopback to the data select 42 also in the standby unit where it is supplied on lead 160 to the monitor 46 for the bit by bit testing.

The datapath used in the checking of FIG. 12 checks the operational status of the low speed demux interface units and would be a complement to the checking path used in FIG. 5. As illustrated, the data received directly from demultiplexer 24 is supplied to monitor 46 to be compared with that data which is passed through the demultiplex sections of the various interface units 10 through 12 to the customer. This data is then rerouted back through the demultiplex switch 70 and via lead 126 and multiplex switch 78 to the appropriate standby units 62 through 64. The signal is then returned via lead 158 to multiplex select unit 46 for application to monitor 46. The signal from the first multiplex select unit 40 is delayed for the appropriate amount of time so that the monitor may perform its bit by bit compare on the incoming data.

Through the various responses obtained from the monitor to each of the path checks, a determination can be made as to where a failure occurred with a very high probability of accuracy.

In FIG. 13, it will be noted that the data select block 48 of monitor 46 is illustrated as two separate blocks 200 and 202. All of the incoming data is applied to both of these blocks. Thus, the operation can be discussed as datapaths A and B. As shown, datapath B is the path which requires the delay to have the data occur at a time equal with that incoming on datapath A. The master control unit 82, depending upon the path of the data, can provide an approximate coarse delay via information supplied on lead 204 to coarse delay 238. Thus, the elastic buffer 212 is merely adjusting the data on path B to be clock coincident with that on path A. The fine delay block 240 is adjusted by information returned on error signal line 250 from the exclusive OR gate 248. When the delays are identical, the good bit counter 242 counts a prescribed number of good compares before supplying a signal to the status buffer 228 which returns an output signal to the master control 82 of FIGS. 1 though 12. There are various determinations of faults in that if there is no clock, data or out-of-frame information, it may be assumed that the transmission line is completely severed at some place or there is no power to one of the multiplexing-demultiplexing units. However, if a clock signal appears and no data, in all probability a demultiplexer or multiplexer in one of the paths is not operating properly. If there is data and clock but no subframe or majorframe signals, the problem is normally in the multiplexer although occasionally it will be in a demultiplexer in the path.

These deductions can be simply programmed into the master control 82 either in a hard-wired or software configuration and a probable indication of data transmission fault can be provided from master control 82.

If it is found that a given signal fails for having lack of clock, data or frame indications and it is a signal received either from the customer or from the DS3 line, all of the compares will provide a satisfactory compare thereby indicating that the fault is not in the present unit but is in a downstream or upstream unit. By noting which group the signal appears on, the source of the fault can be reasonably determined even though the fault has occurred in a remote unit.

The flow diagram of FIG. 14 is believed clear as drawn and from the information supplied in the Detailed Description. This is merely a flow diagram of the operation of the monitor 46 as presented in FIG. 13 and further discussion is believed unnecessary.

As previously indicated, the present inventive concept uses a demultiplexer design presented in copending applications wherein there is a common frequency or data format at which frequency all signals are switched as they are being transferred between high speed muldems and low speed interface units comprising a composite muldem. When this type of muldem is used, a single monitor can be utilized in conjunction with a master control to alter signal paths of a duplicate of customer data through the muldem in various ways and logical deductions can be made from a comparison of that data in conjunction with detection of data, clock and frame type signals to reasonably accurately deduce the source of problems in the muldem whether these problems be in circuitry or interconnecting transmission lines. By using a copy or duplicate version of the customer data rather than a generated source of signals, the amount of circuitry is reduced, and the possibility of generating data of a type which would not cause problems as compared to actual data is eliminated.

In view of the above, we wish to be limited not by the specific embodiment illustrated or the datapaths shown as examples to be used in the testing process but only by the scope of the appended claims.

Wherein we claim:

1. Testing apparatus of the class described comprising, in combination:
   high speed to low speed muldem apparatus comprising a plurality of multiplex-demultiplex modules where each of the modules interfaces between a common frequency and, depending on the application, one of either a customer low speed frequency or a high speed line frequency;
   bit by bit comparator apparatus connected to each of said modules for testing the module by comparing data input to the module at the common frequency with data output by the module and returned through other datapaths where it is returned to the common frequency and checked for identity of logic value with the data input;
   means for directing typical transmission line data to a module to be tested for operability and to said comparator apparatus; and
   means for providing a return datapath connection, including reconversion means to said common frequency, for the non-common frequency terminals of said module to be tested to said comparator means for the bit by bit comparison testing.

2. Apparatus for converting between signals on a high speed multiplexed data transmission line and a plurality of lower speed multiplexed customer data transmission lines and for testing the conversion modules used therein comprising, in combination:
   high speed first signal interface module means including multiplex and demultiplex portions, said first module means converting from a high speed frequency to a common frequency;
   a plurality of low speed second signal interface module means each including multiplex and demultiplex portions, said second module means converting from a low speed customer frequency to said common frequency; and
   testing third means connected to said first and second module means for selectively connecting a module in a test condition and receiving data therefrom at said common frequency from which to ascertain operability of the module being tested.

3. Muldem apparatus comprising, in combination:
   at least one high speed to common frequency multiplex-demultiplex module;
   a plurality of low speed to common frequency multiplex-demultiplex modules; and
   bit by bit comparator test means, operating only at said common frequency, for testing, through signal datapath looped back conditions, any of said modules by comparing signals indicative of data input to and output from said modules.

4. Apparatus for checking communication equipment by rerouting data signals and comparing results comprising, in combination:
   high speed signal interface first means including multiplex and demultiplex portions, said first means converting signals from a high to a common frequency;
   a multiplicity of low speed signal interface second means including multiplex and demultiplex portions, said second means converting signals between a low speed and a common frequency;
   standby high speed signal interface third means including multiplex and demultiplex portions, said third means converting signals from a high to a common frequency;
   standby low speed signal interface fourth means including multiplex and demultiplex portions, said fourth means converting signals from a low speed to a common frequency;

bit by bit signal comparator testing fifth means including first and second input means;

control sixth means interconnecting said first through fifth means for normally routing signals between said first and said second means and alternately routing signals through said third and fourth means as apparent data transmission faults are detected in said first or said second means; and interconnect seventh means for routing incoming signals through said demultiplex portion of said third means to said first input means of said fifth means and for also routing incoming high speed data signals which have completed their normal path through the demultiplex portions of said first means and said second means back through said multiplex portion of said fourth means to said second input means of said sixth means, a satisfactory comparison test indicating proper operation of the demultiplex portions of said first, second and third means and the multiplex portion of said fourth means.

5. The method of testing for datapath failure in a high speed/low speed muldem having primary and standby multiplexers and demultiplexers for operability while the system is actively passing data comprising, the steps of:

routing data signals, at a common frequency in a switching network between high speed and low speed muldem portions, between main units, between standby units and between main and standby units; and comparing data bits input to and output from said muldem in a bit by bit comparator by demultiplexing the high speed signals in a standby high speed module and multiplexing the low speed signals in a standby low speed module, the outputs of said standby modules comparing identically when the main data paths are functioning properly.

6. The method of testing for datapath failure in a high speed/low speed muldem having primary and standby multiplexers and demultiplexers for operability while the system is actively passing data comprising, the steps of:

routing data signals, at a common frequency in a switching network between high speed and low speed muldem portions, between main units, between standby units and between main and standby units;

multiplexing signals received by the low speed portion of said muldem in a standby multiplexer to generate a first test signal;

multiplexing and demultiplexing the first test signal in a loopback configuration of the high speed standby muldem portion to generate a second test signal; and comparing said first and second test signal on a bit by bit basis, the comparison equaling true when the standby high speed datapath is functioning properly.

7. The method of checking an operational muldem during data transmission having main high speed and main low speed sections and standby modules for each of said sections for datapath failure wherein the sections and modules include multiplexers and demultiplexers comprising, the steps of:

routing data signals, at a common frequency, in a switching network between the high speed sections, the low speed sections and the standby modules;

monitoring first and second test signals as applied for bit by bit comparison;

first checking the demultiplexer main sections by returning outgoing signals through appropriate standby low speed multiplexers to provide a first test signal for a first set of comparisons and by routing the incoming signal through the high speed standby demultiplexer to selectively provide a second test signal to be used in the first set of comparisons;

second checking the multiplexer main sections by selectively routing incoming signals through appropriate standby low speed multiplexers to provide a first test signal for a second set of comparisons and by alternately returning the outgoing signal through the high speed standby demultiplexer to selectively provide a second test signal to be used in the second set of comparisons;

third, when either of the first and second checks reveals a datapath failure, checking each individual datapath in the main high speed section by comparing as a third test signal the data signal at the common frequency and an alternate path version of said data as a second test signal supplied by the standby high speed demultiplexer for a third set of comparisons; and finally, when either of the first and second checks reveals a datapath failure, checking each individual datapath in the main low speed section by comparing as a fourth test signal the data signal at the common frequency and an alternate path version of said data as a second test signal supplied by the standby low speed multiplexer for a fourth set of comparisons.

8. Apparatus for providing a frequency converting function between signals on a high speed multiplexed data transmission line and a plurality of lower speed multiplexed customer data transmission lines and for testing the conversion modules used therein comprising, in combination:

high speed first signal interface modules means including multiplex and demultiplex portions, said first module means providing a two-way function of converting signals between a high speed frequency and a common frequency;

a plurality of low speed second signal interface module means each including multiplex and demultiplex portions, said second module means providing a two-way function of signals between a low speed customer frequency and said common frequency; and testing third means connected to said first and second module means for selectively connecting at least one module to be tested and receiving versions of data provided to and passed therethrough and returned to said testing third means at said common frequency from which data the apparatus may deduce the probability of satisfactory operation of the module being tested.

9. Muldem apparatus comprising, in combination:

high frequency to common frequency first interface module means including multiplex and demultiplex portions;

a plurality of common frequency to low frequency second interface module means each including multiplex and demultiplex portions;

datapath testing third means;

high speed data fourth means, connected to said first module means, for supplying data to and receiving data from said first means;

low speed data fifth means, connected to said second module means, for supplying data to and receiving data from said second means; and control sixth means, connected to said first, second, third, fourth and fifth means, for selectively manipulating datapaths whereby said third means compares two data streams derived from muldem received data to test muldem operability.

* * * * *